April 20, 1926.
L. E. HASSLER
ILLUSTRATING DEVICE
Filed August 6, 1924     5 Sheets-Sheet 1
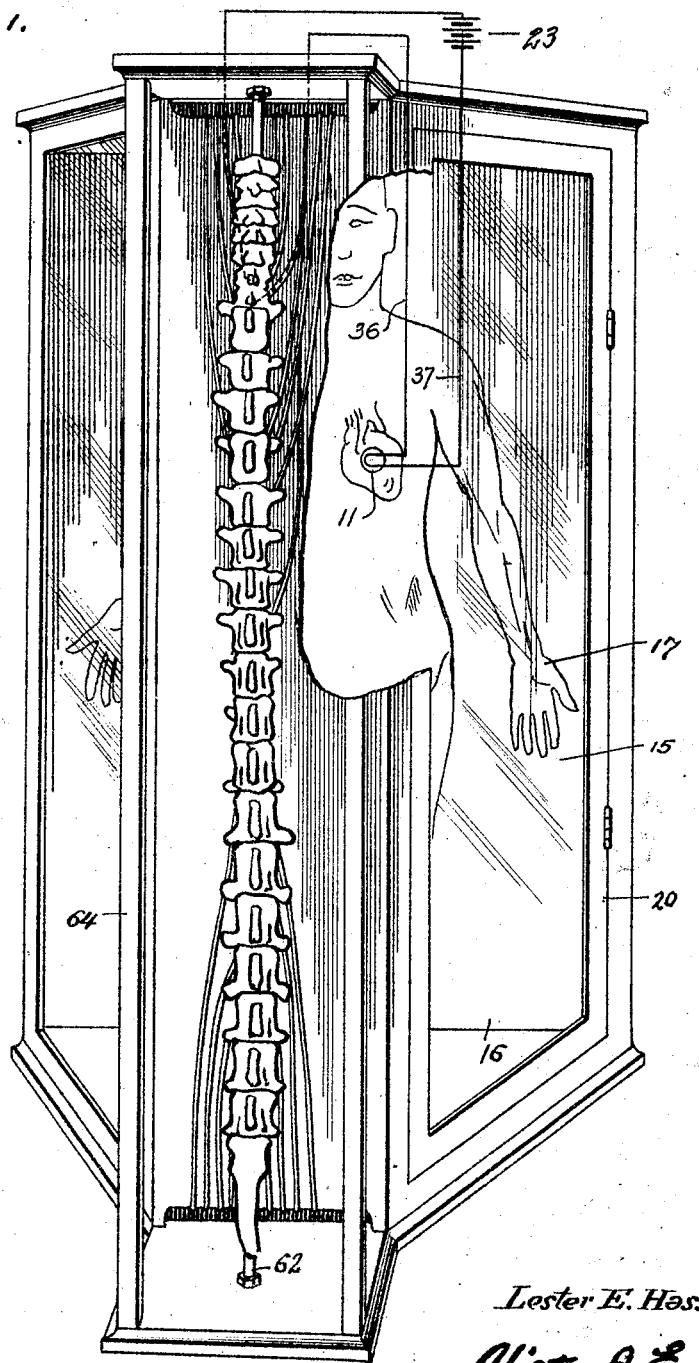

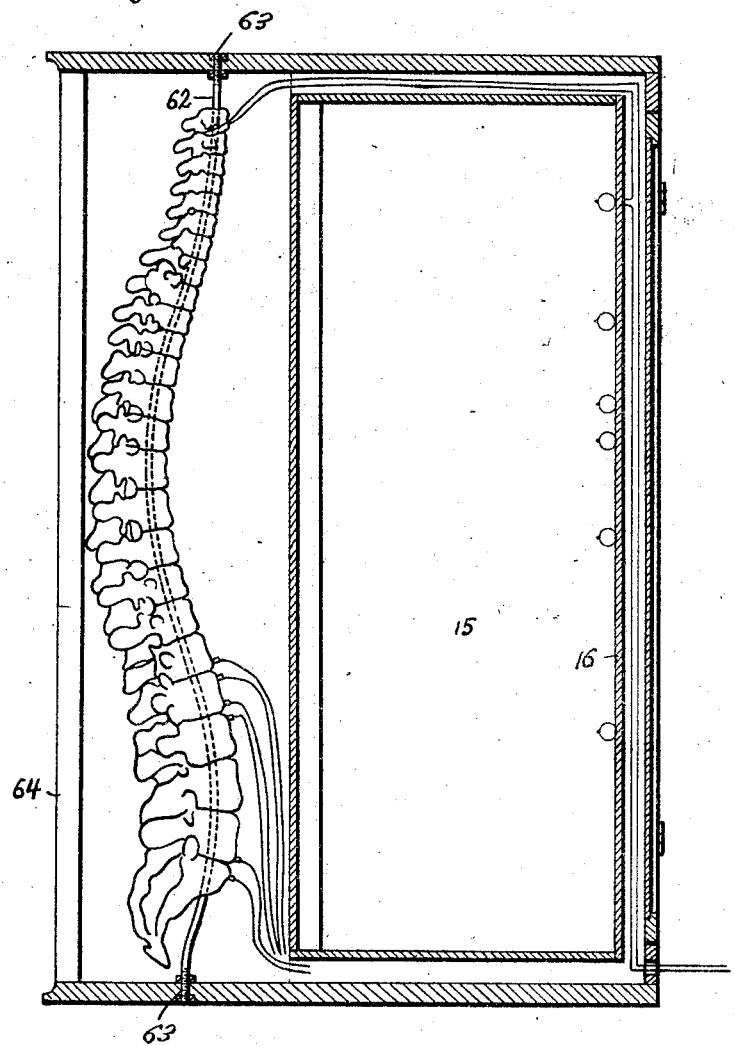

April 20, 1926.
L. E. HASSLER
1,581,736
ILLUSTRATING DEVICE
Filed August 6, 1924
5 Sheets-Sheet 3
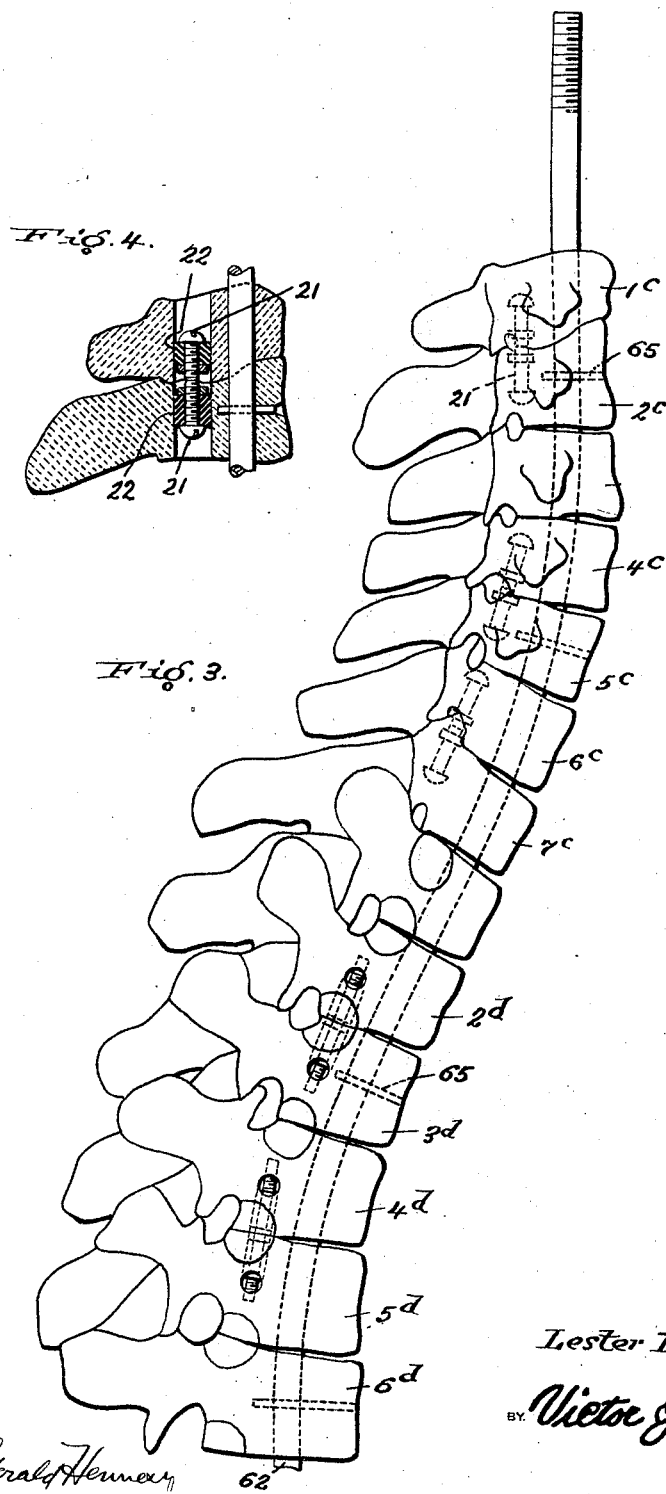
Lester E. Hassler
INVENTOR
BY Victor J. Evans
ATTORNEY April 20, 1926.  
L. E. HASSLER  
ILLUSTRATING DEVICE  
Filed August 6, 1924  
1,581,736  
5 Sheets-Sheet 4
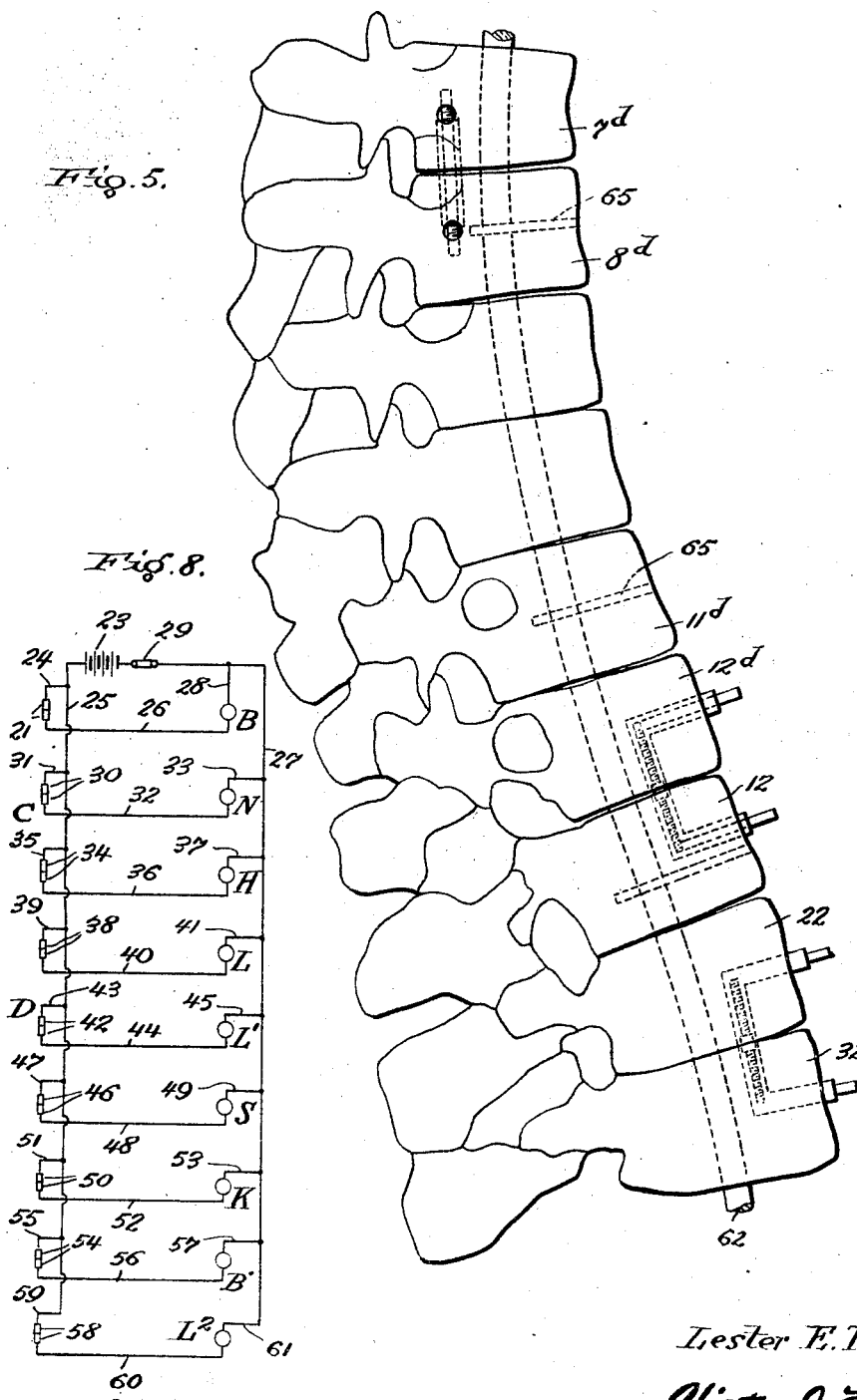

April 20, 1926.
L. E. HASSLER
1,581,736
ILLUSTRATING DEVICE
Filed August 6, 1924       5 Sheets-Sheet 5
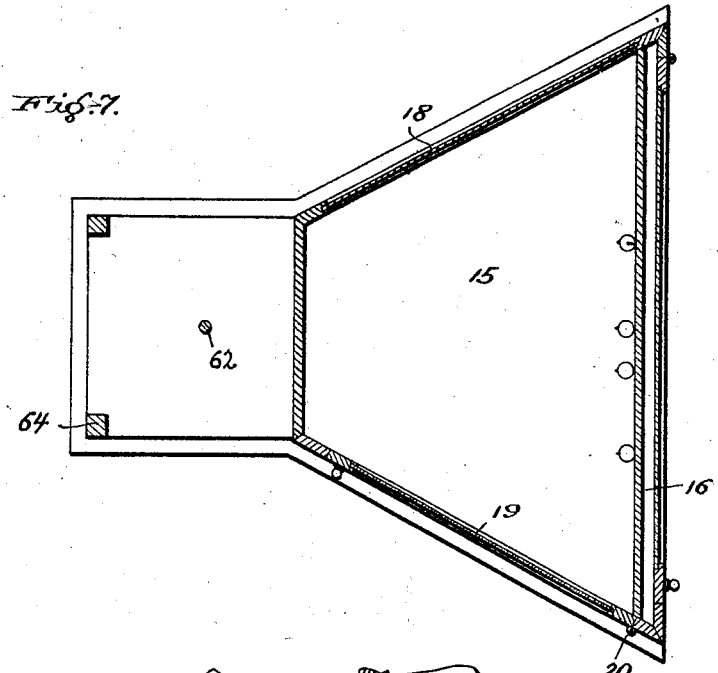
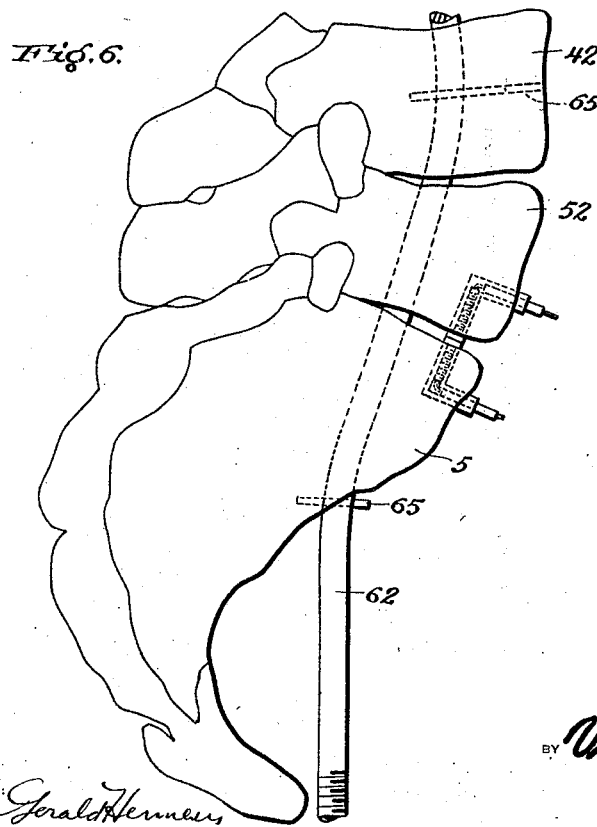
Lester E. Hassler
INVENTOR
BY Victor J. Evans
ATTORNEY Patented Apr. 20, 1926.

1,581,736

UNITED STATES PATENT OFFICE.

LESTER E. HASSLER, OF BOYERS, PENNSYLVANIA.

ILLUSTRATING DEVICE.

Application filed August 6, 1924. Serial No. 730,519.

*To all whom it may concern:*

Be it known that I, LESTER E. HASSLER, a citizen of the United States, residing at Boyers, in the county of Butler and State of Pennsylvania, have invented new and useful Improvements in Illustrating Devices, of which the following is a specification.

This invention relates to demonstrating devices particularly adapted for showing or illustrating the effect of adjustments of the human spine, the invention being especially adapted for the use of chiropractors so that prospective patients and others may visualize the effect of dislocations of the spinal vertebræ and the effect of adjustments of the same, as well as serving as a valuable aid in lecturing.

To this end, the invention aims to provide a chart representing the human anatomy, certain or all of the organs having individual electric signals which are controlled by circuit controlling devices sealed within a spinal column and connected to the signals, whereby manipulation of certain of the vertebræ will control the signals of the organs to which in the human body they are connected by spinal nerves and thus simulate the effect of spinal adjustments upon the organs of the body.

With the above and other objects in view, the invention further includes the following novel features and details of construction, to be hereinafter more fully described, illustrated in the accompanying drawings and pointed out in the appended claims.

In the drawings:—

Figure 1 is a perspective view of an illustrating or visualizing device constructed in accordance with the invention.

Figure 2 is a vertical central sectional view of the same.

Figure 3 is an enlarged side elevation illustrating a portion of the human spine, the manner of mounting the same and the circuit controlling devices carried thereby, the portions shown illustrating the first cervical to the sixth dorsal.

Figure 4 is a sectional view showing the first and second cervical.

Figure 5 is a view similar to Figure 1 illustrating that portion of the spine from the seventh dorsal to the third lumbar.

Figure 6 is a fragmentary view showing the remaining portion of the spinal column.

Figure 7 is a horizontal sectional view of the demonstrating cabinet with the spinal column or controlling devices removed.

Figure 8 is a diagrammatic view illustrating the connection between the circuit controlling devices and the signals.

Referring to the drawings in detail wherein like characters of reference denote corresponding parts, the invention as shown comprises a cabinet which includes a chart chamber 15. This chamber includes a rear wall 16 upon which is mounted a chart 17 representing the human anatomy. The side walls 18 and 19 of the chamber 15 converge and include transparent panels through which the chart 17 may be plainly seen, the side wall 19 being preferably in the form of a door hinged as indicated at 20, so that access may be had to the interior of the chart chamber.

Certain portions of the chart 17 may be provided with electric signal devices to indicate certain or all of the organs of the anatomy and these devices are herein shown in the form of lamps, and for purposes of explanation one organ is provided with a signal lamp B, another with a signal lamp N, another with a signal lamp H, another with a signal lamp L, another with a signal lamp L', another with a signal lamp S, another with a signal lamp K, another with a signal lamp B', and another with a signal lamp $L^2$. Each of these lamps is controlled by a pair of normally closed contact elements arranged within the vertebræ which are connected to the organs referred to by the spinal nerves. For this purpose, the first and second cervicals indicated respectively at $1^c$ and $2^c$ carry contact elements 21 which are shown in the forms of screws mounted in suitable insulating blocks 22 arranged within the space ordinarily occupied by the spinal cord. The contact element 21 of the first cervical $1^c$ is connected to a suitable source of current 23 by means of a conductor 24 which is attached on to a common supply wire 25. The other contact element 21 of the second cervical $2^c$ is connected by means of a conductor 26 to the lamp B and the latter is connected to a common return wire 27 by means of a conductor 28. The common return wire is connected with the source of current 23 and has included therein a manually operated switch 29. The fourth and fifth cervicals indicated at $4^c$ and $5^c$ carry contact elements 30 which are similar to the contact elements 21. One of the elements 30 is connected to the common supply wire 25 by a conductor 31 while the other element is connected by a conductor 32 with the lamp N and the latter is connected to the common return wire 27 by a conductor 33. The sixth and seventh cervicals indicated at 6ᶜ and 7ᶜ respectively carry contacts 34, one of which is connected to the supply wire 25 by a conductor 35 while the other is connected to the lamp H by a conductor 36, a conductor 37 connecting the lamp H with the common return wire 27.

The second and third dorsals indicated at 2ᵈ and 3ᵈ respectively carry contact elements 38 which may slightly differ from the contact elements previously described and are shown as comprising screws carried by suitable insulating sleeves. One of the elements 38 is connected by a conductor 39 with the wire 25 while the other element is connected by a conductor 50 with the lamp L of the legs. This lamp is connected to the return wire 27 by a conductor 41. The fourth and fifth dorsals indicated at 4ᵈ and 5ᵈ respectively are provided with contact elements 42 which are preferably similar to the contact elements 38. One of these elements 42 is connected by a conductor 43 with the wire 25 while the other element is connected by a conductor 44 with the lamp L', the latter being connected by a conductor 45 with the wire 27. The seventh and eighth dorsals indicated at 7ᵈ and 8ᵈ respectively carry contacts 46, one of which is connected by a conductor 47 with the wire 25 while the other is connected by a conductor 48 with the lamp S and the latter is connected by a conductor 49 with the wire 27. The twelfth dorsal indicated at 12ᵈ and the first lumbar indicated at 1ˡ carry contact elements 50, the contact element of the vertebræ 12ᵇ being connected to the wire 25 by a conductor 51, while the other contact element 50 is connected by a conductor 52 to the lamp K and the latter is connected by a conductor 53 with the wire 27. The second and third lumbar indicated at 2ˡ and 3ˡ respectively carry contact elements 54 which are connected by a conductor 55 with the wire 25 and the conductor 56 with the lamp B' and the latter is in turn connected to the wire 27 by a conductor 57. The fifth lumbar indicated at 5ˡ and the sacrum indicated at s carry contact elements 58, the former being connected by a conductor 59 with the wire 25 and the latter by means of a conductor 60 with the lamp L². A conductor 61 connects this lamp with the wire 27.

It will be seen by reference to Figure 8 of the drawings that the signals and contact elements are connected in parallel with the source of current and as the contact elements engage when the vertebræ are in their normal position, the signal lamps will remain lighted. Should however the vertebræ which carry the contact elements be subluxed or flexed, the lamp which is connected with these signal elements will be extinguished due to interruption of current to the lamp. The particular part of the spine affected will thus be indicated. Upon properly adjusting the vertebræ, the lamp will again be lighted and the effect of corrective treatment illustrated. The spinal column thus provides a controlling device for the lamps.

The spinal column is mounted upon a rod 62 whose opposite ends are secured in extended portions of the base and top of the cabinet as indicated at 63, the extended portions of the base and top being connected by corner posts or standards 64 so that ready access may be had to the controlling device.

While the drawings illustrate current as supplied from a battery 23, it is of course obvious that any source of current may be provided and if necessary, a transformer may be included in the circuit.

The electric current traveling between the spine and the different organs and other members of the body indicated upon the chart by the bulbs, is analogous to the impulses of the nerves between these members and the spinal cord.

The second and fifth cervical, the third, sixth, eighth and eleventh dorsal, the first and fourth lumbar and the sacrum are secured to the rod 62 by means of pins 65.

The invention is susceptible of various changes in its form, proportions and minor details of construction and the right is herein reserved to make such changes as properly fall within the scope of the appended claims.

Having described the invention what is claimed is:—

1. A device of the character described embodying an anatomical chart, electric signal devices mounted upon the chart and indicating certain portions of the anatomy, a spinal column and contact elements carried by the vertebræ and included in circuit with a source of current and with the signal devices, whereby the signal devices may be selectively controlled by manipulating the vertebræ.

2. A device of the character described embodying an anatomical chart, electric signal devices mounted upon the chart and indicating certain portions of the anatomy, a spinal column and normally engaged contact elements carried by the vertebræ and included in circuit with a source of current and with the signal devices, whereby the latter may be selectively controlled by manipulating the vertebræ.

3. A device of the character described embodying a cabinet, a chart chamber within the cabinet, an anatomical chart upon one wall of the chart chamber, converging transparent walls at each end of the chart wall, electric signal devices upon the chart, a front wall connecting the transparent walls, a controlling device located adjacent the front wall and included in circuit with a source of current and with the signal devices and means included in the controlling device, whereby the signal devices may be selectively controlled.

4. A device of the character described embodying a cabinet, a chart chamber within the cabinet, an anatomical chart upon one wall of the chart chamber, converging transparent walls at each end of the chart wall, electric signal devices upon the chart, a front wall connecting the transparent walls, a spinal column located adjacent the front wall, a rod extending longitudinally through said column and having its opposite ends connected to the base and top of the cabinet and means carried by the vertebræ and included in circuit with a source of current and with the signal devices, whereby the latter may be selectively controlled by manipulating the vertebræ.

5. A device of the character described embodying an anatomical chart, electric signal devices mounted upon the chart and indicating certain parts of the anatomy, a plurality of normally engaged relatively movable members and contact elements carried by said members and disposed in contacting relation to render the signal devices active when said members are in normal position only.

6. A device of the character described embodying a plurality of normally engaged relatively movable members, an anatomical chart, electric devices mounted upon the chart and indicating certain portions of the anatomy and contact elements carried by said members and disposed in contacting relation to render the signal devices active when the movable members are in normal position only.

In testimony whereof I affix my signature.

LESTER E. HASSLER.